Patented Sept. 10, 1940

2,214,115

UNITED STATES PATENT OFFICE 2,214,115

PROCESS OF MAKING MONO-SODIUM GLUTAMATE FROM GLUTEN

J Paul Bishop, Clarendon Hills, and Floyd Lawrence Tucker, Summit, Ill., assignors, by mesne assignments, to Corn Products Refining Company, New York, N. Y., a corporation of New Jersey No Drawing. Application December 6, 1937, Serial No. 178,428

23 Claims. (Cl. 260—534)

This invention relates to the production of glutamic acid and mono-sodium glutamate and the object of the invention is to provide a commercial, economical process whereby the glutamic acid necessary for the production of the monosodium glutamate may be obtained from corn (maize) gluten. It is possible to use the process commonly employed for making glutamic acid from wheat gluten for obtaining glutamic acid from corn gluten; but when this is done the yields are so small, and the inconveniences of the process so considerable, that the procedure is not economically or commercially feasible.

In the production of glutamic acid from wheat protein (which substance is quite different in its composition and properties from corn protein) the amino acids resulting from the hydrolysis of the protein consist of about 50% glutamic acid; while in the hydrolysis of corn gluten the glutamic acid makes up only about 30% of the amino acids, other amino acids such as leucine and tyrosine being present in such relatively large quantities that they tend to inhibit the crystallization of the glutamic acid under conditions which admit of successful crystallization in the case of the wheat gluten process.

An entirely new technique is necessary, therefore, for the production of glutamic acid from corn gluten, if yields are to be obtained large enough to make the process feasible from the economic point of view. It is the object of the present invention to provide this new technique, which, in the preferred embodiment of the invention herein discovered consists of the following procedures:

(1) The corn gluten as it comes from the wet starch process of making starch from corn contains quite a high percentage of starch; and while it is possible to use the present process on gluten containing starch, it is much better to start with a substantially starch free gluten in order to minimize the formation of excessive quantities of humin substances in carrying out the process. The corn gluten from the starch making process is, therefore, de-starched by malting or other similar known operation for removing starch from gluten.

(2) The starch free gluten is hydrolyzed by adding the gluten to hot acid, preferably at 200° F. and boiling under a reflux condenser with three to four times its weight of 20% (13.0° Baumé) hydrochloric acid which is a constant boiling concentration for this acid.

(3) The next step is to separate the insoluble humin from the solution of amino acids by spinning in a perforated basket centrifuge. It has been found that the separating operation can be accomplished much more advantageously by centrifugal force than by the customary filtering operation. The operation is faster. It requires a smaller amount of wash water and this means less evaporation in the next step and a more concentrated solution of hydrochloric acid recovered for re-use. It produces a dryer humin cake which is an advantage if this by-product is to be treated to produce a de-colorizing carbon, as contemplated by the present invention.

(4) The solution of amino acids is concentrated to 28° to 33° Baumé by boiling under reduced pressure. The Baumés given herein are calculated on a 60° F. basis as is common in this art. While the concentration might be somewhat lower or higher than the range indicated, experience has shown that a range of 28° to 33° Baumé is the best in order to give yields as high as possible that is, if the Baumé is substantially below 28°, the yield of glutamic acid hydrochloride is much reduced. If the Baumé is substantially above 33°, the hydrolysate becomes too thick, making crystallizer processing impractical, particularly if the preferred method of crystallization in motion be employed.

(5) Crude glutamic acid hydrochloride from the previous batch (paragraph 7) is mixed with a syrup made by acidifying and evaporating the filtrate from the glutamic acid crystals, described later (paragraph 9). This suspension is then mixed into the warm concentrated solution of amino acids (paragraph 4), and the mixture is cooled to 60° F. or lower. Finally strong hydrochloric acid (preferably 23° Baumé or 37%) is added in the proportion of 1 to 1½ pounds of acid per pound of the gluten which was hydrolyzed (paragraph 2); this fortified and acidified solution, seeded with solid phase glutamic acid hydrochloride to facilitate crystallization, is then cooled to 45° F. or lower and kept in slow agitation, for example in a crystallizing vessel, provided with an agitator revolving at one revolution per thirty minutes, during the crystallization of the glutamic acid hydrochloride, which requires 20 to 30 hours. The introduction of glutamic acid, as glutamic acid and/or as glutamic acid hydrochloride tends to overcome the retarding effect of the leucine, which is present in relatively large quantities in hydrolyzed corn gluten, on the crystallization of the glutamic acid hydrochloride in solution. In the form of the invention disclosed glutamic acid hydrochloride is added to the purified hydrolysate from two sources, that as solid phase crystallized in the glutamic acid crystallization and as a liquid formed by the addition of hydrochloric acid to the mother liquor from the glutamic acid crystallization.

(6) The mixture of crystals and mother liquor is filtered by spinning in a perforated basket centrifuge or other suitable means. This removes, to a large extent, the other amino acids and the excess hydrochloric acid.

(7) The glutamic acid hydrochloride crystals are divided into two equal parts. One part is returned to the concentrated liquor (paragraph 5) of a succeeding batch. The other part is dissolved in 2 to 4 times its weight of water and decolorized by boiling with activated carbon and filtering off the carbon and adsorbed coloring matter. If insufficient water is used in this step, the glutamic acid which is precipitated in the following step will be contaminated with other amino acids which require a large amount of water to dissolve them and sodium chloride. By subjecting the material to the adsorption treatment at this stage instead of immediately after the hydrolysate is produced, the necessary amount of carbon is much reduced. Furthermore, there is an advantage in having present in the liquor during crystallization the colloids which are removed by adsorption, as these colloids retard crystallization and make possible the expedient of crystallization in motion or with agitation, whereby a fluent massecuite is produced from which the mother liquor may be easily removed by centrifuging or filtering. If these colloids are removed at the completion of the hydrolysis, the glutamic acid hydrochloride solution would tend to crystallize so rapidly as to become a solid mass resisting agitation, making the removal of mother liquor difficult. However, because slow agitation is employed, crystallization proceeds more rapidly than it would otherwise, with the colloids present, and this compensates to some extent for the retardation due to the presence of the colloids.

(8) The decolorized liquor is neutralized to pH 3.1–3.3, by adding a 40° Baumé solution of sodium hydroxide or other sodium base such as sodium carbonate or bi-carbonate in solution or powdered form. The best results are obtained if the solution is neutralized before the temperature drops below 150° F. The solution is then agitated while being cooled to 65–75° F. During the cooling the glutamic acid precipitates in large pure crystals. The mixture of crystals and mother liquor is agitated for an hour or more after cooling and then filtered or centrifuged.

(9) The filtrate from the glutamic acid crystals is acidified to a pH of 0.8–1.0 by the addition of hydrochloric acid, and then concentrated to 25.5–26.5° Baumé in an open kettle with agitation, or in an evaporator equipped for salt removal. The liquor is separated from the precipitated salt (NaCl) by settling and decanting, by centrifuging, or by filtering. The liquor is then added to the concentrated solution of amino acids (paragraph 5) of a succeeding batch.

(10) The glutamic acid crystals are suspended in about twice their weight of water, and a 40° Baumé solution of sodium hydroxide (or other sodium base) is added until the pH reaches 7.0. This brings the glutamic acid into solution as mono-sodium glutamate. This solution may be decolorized at this step by boiling with activated carbon and filtering, but a decolorizing here is usually unnecessary. If the solution has been diluted for decolorizing, it is concentrated to a thick syrup by boiling in an open kettle or in a vacuum evaporator.

(11) The concentrated solution of mono-sodium glutamate is then evaporated to dryness on an internally heated rotating cylinder or disc. The drying cylinder or disc may be heated by steam at a pressure of 155 pounds per square inch, and the heat regulated so that the product stripped from the cylinder by the usual doctor blade has a temperature of about 120° F.

The finished product is a relatively pure white mono-sodium glutamate containing as impurity only a relatively small amount of salt (NaCl).

The purpose of producing glutamic acid from the glutamic acid hydrochloride, dissolving the glutamic acid crystals in water and then adding the sodium compound for the production of mono-sodium glutamate, instead of neutralizing the hydrochloride directly to mono-sodium glutamate, is to prevent contamination of the final product with the salts of the other amino acids; the iso-electric points of the salts of the various amino acids being close together while the iso-electric points of the acids themselves are further apart.

The following is a specific example of the application of the invention to practice. It will be understood that the procedures given are illustrative and typical and are not to be regarded as limiting the invention to the specific data given, the intention being to cover all equivalents and all modifications within the scope of the appended claims.

*Example*

100 pounds low starch corn gluten (which will ordinarily contain 75–85% protein and substantially 5% moisture) are introduced into 330 pounds of hot (200°–210° F.) 20% (13° Baumé) hydrochloric acid in a digester and boiled under a reflux condenser for between 8–12 hours. The digested material, preferably after cooling to about 140° F., is centrifuged and washed with hot water. The solid matter left in the centrifuge consists of about 14 pounds of humin and 22 pounds of water. The liquid from the centrifuge, consisting of a solution of amino acids, is evaporated under reduced pressure to about 20 gallons of liquor having a density of 28°–33° Baumé. The hydrochloric acid recovered from the vapors from the evaporator is used in the hydrolysis of a succeeding batch.

Crude glutamic acid hydrochloride from a preceding batch is mixed with the warm concentrated solution as it comes from the evaporator. The small amount of leucine or amino acids, other than glutamic acid, in the glutamic acid hydrochloride dissolves in the warm liquor and leaves only the bare glutamic acid hydrochloride crystals to serve as seed. This mixture is then cooled to 50°–60° F. and a syrup to be described later is added. Finally 100–150 pounds of 37% (23° Baumé) hydrochloric acid is added. The density of this mixture should be about 27.5°–28.5° Baumé. It is cooled to 45° F. and slowly agitated for 20 to 40 hours. The speed of agitation is about one revolution in 30 minutes. If the agitation is too fast the crystals will be small and interfere with filtration. The crystals of glutamic acid hydrochloride are then separated from the motor liquor by spinning in a perforated basket centrifuge. The liquor (about 28 gallons) is evaporated to recover the hydrochloric acid and the residue then treated for recovery of other amino acids. The glutamic acid hydrochloride which weighs about 104 pounds, as taken from the centrifuge, is divided into two equal parts. One part is put back as seed into the next batch, as above described, and the other part is dissolved in about 20 gallons of water and decolorized by boiling with 15 pounds activated carbon and filtered. This decolorized solution is then neutralized to pH 3.2 while still hot with about 28 pounds of 40° Baumé sodium hydroxide solution. It is then cooled with stirring to about 70° F., stirred for about one hour longer to allow most of the glutamic acid to precipitate and is then filtered or centrifuged.

The filtrate from the glutamic acid crystals is acidified to about 0.8 to 1.0 pH with hydrochloric acid and concentrated to 25.5°–26.5° Baumé by boiling in a salt removing evaporator, or in an open kettle with agitation. The salt (NaCl) which has precipitated is allowed to settle without cooling and the liquor is syphoned off and is the syrup which is added to the concentrated hydrolysate as above described.

The glutamic acid crystals are suspended in about 3 gallons of water and neutralized to pH 7.0 with about 11.5 pounds 40° Baumé sodium hydroxide. This clear solution of mono-sodium glutamate is then evaporated to dryness, preferably on an internally heated cylindrical drum dryer, the process yielding 15 pounds of mono-sodium glutamate containing 5% moisture and not over 1% salt (NaCl).

The decolorization of the glutamic acid hydrochloride (paragraph 7) facilitates the process by removing from the solution mud forming ingredients.

By adding to the solution of amino acids either glutamic acid hydrochloride or glutamic acid or both as described in paragraph 5, the concentration of glutamic acid in relation to other amino acids, particularly leucine, is increased and this minimizes the influence of the leucine on the crystallization of glutamic acid and thereby increases the yield of glutamic acid. This is of particular importance in the treatment of corn gluten because of the high percentage of leucine in proportion to glutamic acid in corn gluten hydrolysates.

It is the intention to cover by patent all equivalents of the precedures above described and also all modifications of the process within the scope of the appended claims.

The process could be used on other cereal proteins; and by the use of different bases such as calcium hydroxide or magnesium hydroxide, other glutamic acid salts could be made.

We claim:

1. Process for the production of glutamic acid hydrochloride and derivative products from corn gluten which comprises: hydrolyzing the corn gluten to form a solution containing glutamic and other amino acids; purifying the solution of humin substances; adding thereto hydrochloric acid; concentrating the solution; cooling it to supersaturation, and bringing about crystallization of glumatic acid hydrochloride with the material in slow agitation; and removing the mother liquor from the glutamic acid hydrochloride crystals.

2. Process for the production of glutamic acid hydrochloride and derivative products from corn gluten which comprises: hydrolyzing the corn gluten to form a solution containing glutamic and other amino acids and purifying the solution of humin substances; adding thereto hydrochloric acid; concentrating the solution to about 28°–33° Baumé, cooling it to 45° F. or lower, and bringing about crystallization of glutamic acid hydrochloride with the material in slow agitation; and removing the mother liquor from the crystals.

3. Process for the production of glutamic acid hydrochloride and derivative products from corn gluten which comprises: hydrolyzing the corn gluten to form a solution containing glutamic and other amino acids; purifying the solution of humin substances; crystallizing the glutamic acid hydrochloride and separating the mother liquor from the crystals; dissolving the glutamic acid hydrochloride crystals in two to four times their weight of water; purifying the solution; neutralizing the purified solution to bring about precipitation of glutamic acid crystals free from other amino acids; and separating the mother liquor from the crystals.

4. Process for the production of glutamic acid hydrochloride and derivative products from corn gluten which comprises: hydrolyzing the corn gluten to form a solution containing glutamic and other amino acids; adding glutamic acid to the solution to overcome the retarding action of leucine during the crystallizing operation; adding hydrochloric acid to the solution; crystallizing the glutamic acid hydrochloride; and removing the mother liquor from the crystals.

5. Process for the production of glutamic acid hydrochloride and derivative products from corn gluten which comprises: hydrolyzing the corn gluten to form a solution containing glutamic and other amino acids; purifying the solution of humin substances; adding hydrochloric acid to the solution; adding glutamic acid to the solution to overcome the retarding action of leucine during crystallization; concentrating the solution to 28°–33° Baumé and cooling it to 45° F. or lower to bring about the crystallization of glutamic acid hydrochloride; and removing the mother liquor from the crystals.

6. Process for the production of glutamic acid hydrochloride and derivative products from corn gluten which comprises: boiling corn gluten and hydrochloric acid at a constant boiling concentration to form a solution containing glutamic and other amino acids; purifying the solution of humin substances; concentrating the solution to 28°–33° Baumé; adding to the solution glutamic acid and hydrochloric acid; cooling the solution to about 45° F. or lower and slowly agitating the material to bring about crystallization of glutamic acid hydrochloride; and removing the mother liquor from the crystals.

7. Process for the production of glutamic acid hydrochloride and derivative products from corn gluten which comprises: boiling corn gluten and hydrochloric acid to form a solution containing glutamic and other amino acids; purifying the solution of humin substances; concentrating the solution to 28°–33° Baumé; adding to the solution glutamic acid and hydrochloric acid; cooling the solution to about 45° F., or lower, and slowly agitating the material to bring about crystallization of glutamic acid hydrochloride; removing the mother liquor from the crystals; dissolving the glutamic acid hydrochloride crystals in two to four times their weight of water; purifying the solution; neutralizing the solution to about pH 3.1–3.3; cooling the solution to precipitate glutamic acid; and removing the mother liquor from the precipitate.

8. In the production of glutamic acid hydrochloride and derivative products from corn gluten which includes hydrolysis of the corn gluten and crystallization of glutamic acid hydrochloride from the hydrolysate, the improvement which consists in adding glutamic acid to the hydrolysate to counteract the tendency of the leucine to retard crystallization of the glutamic acid.

9. In the production of glutamic acid hydrochloride and derivative products from protein matter the hydrolysate of which contains a large proportion of leucine relative to the glutamic acid content by a process which includes hydrolysis of the protein matter and crystallization of glutamic acid hydrochloride from the hydrolysate, the improvement which consists in adding glutamic acid to the hydrolysate to counteract the tendency of the leucine to retard crystallization of the glutamic acid.

10. Process for the production of glutamic acid hydrochloride and derivative products from a corn gluten hydrolysate which comprises: bringing about the crystallization of glutamic acid hydrochloride from the solution of glutamic acid hydrochloride and separating the mother liquor from the crystals; dissolving the glutamic acid hydrochloride in water and treating the solution with activated carbon; removing the carbon and adsorbed impurities; neutralizing the solution; and bringing about the crystallization of glutamic acid and removing the mother liquor from the crystals.

11. Process for the production of glutamic acid hydrochloride and derivative products from a corn gluten hydrolysate which comprises: bringing about the crystallization of glutamic acid hydrochloride from the solution of glutamic acid hydrochloride with the material in slow agitation and separating the mother liquor from the crystals; dissolving the glutamic acid hydrochloride in water and treating the solution with activated carbon; removing the carbon and adsorbed impurities; neutralizing the solution; and bringing about the crystallization of glutamic acid and removal of the mother liquor from the crystals.

12. Process for the production of glutamic acid hydrochloride and derivative products from a corn gluten hydrolysate which comprises: bringing about the crystallization of glutamic acid hydrochloride from the solution of glutamic acid hydrochloride with the material in slow agitation and separating the mother liquor from the crystals; dissolving the glutamic acid hydrochloride in water and treating the solution with activated carbon; removing the carbon and adsorbed impurities; neutralizing the solution; and bringing about the crystallization of glutamic acid with agitation and removal of the mother liquor from the crystals.

13. Process for the production of glutamic acid hydrochloride and derivative products from a corn gluten hydrolysate which comprises: concentrating the solution to 28°-33° Baumé; cooling it to below 46° F.; seeding the same with glutamic acid hydrochloride crystals; bringing about crystallization of glutamic acid hydrochloride with the material in slow agitation; removing the mother liquor from the crystals; dissolving the glutamic acid hydrochloride in water and treating the solution with activated carbon; removing the carbon and adsorbed impurities; neutralizing the solution; and bringing about crystallization of glutamic acid and the removal of the mother liquor from the crystals.

14. Process for the production of glutamic acid hydrochloride and derivative products from a corn gluten hydrolysate which comprises: concentrating the solution to 28°-33° Baumé; cooling it to below 46° F.; seeding the same with glutamic acid hydrochloride crystals; bringing about crystallization of glutamic acid hydrochloride with the material in slow agitation; removing the mother liquor from the crystals; dissolving the glutamic acid hydrochloride in water and treating the solution with activated carbon; removing the carbon and adsorbed impurities; neutralizing the solution; and bringing about the crystallization of glutamic acid from the solution at a temperature of 65°-75° F. with the material in agitation; and removing the mother liquor from the crystals.

15. Process for the production of glutamic acid hydrochloride and derivative products from a corn gluten hydrolysate which comprises: concentrating the solution and cooling the same to a supersaturation favorable to crystallization of glutamic acid hydrochloride; keeping the material in slow agitation during the crystallizing operation and separating the mother liquor from the glutamic acid hydrochloride crystals.

16. Process for the production of glutamic acid hydrochloride and derivative products from a corn gluten hydrolysate which comprises: concentrating and cooling the solution to a supersaturation favorable to crystallization of glutamic acid hydrochloride; adding glutamic acid hydrochloride crystals to the solution; keeping the material in slow agitation during the crystallizing operation; and separating the mother liquor from the glutamic acid hydrochloride crystals.

17. Process for the production of glutamic acid hydrochloride and derivative products from a corn gluten hydrolysate which comprises: concentrating and cooling the solution to a supersaturation favorable to crystallization of glutamic acid hydrochloride; adding glutamic acid hydrochloride crystals to the solution in an amount equal to about one-half of the glutamic acid hydrochloride derived from the operation; keeping the material in slow agitation during the crystallizing operation; and separating the mother liquor from the glutamic acid hydrochloride crystals.

18. Process for the production of glutamic acid hydrochloride and derivative products from a corn gluten hydrolysate which comprises: concentrating and cooling the solution to a supersaturation favorable to crystallization of glutamic acid hydrochloride; adding glutamic acid hydrochloride crystals and hydrochloric acid to the solution; keeping the material in slow agitation during the crystallizing operation; and separating the mother liquor from the glutamic acid hydrochloride crystals.

19. Process for the production of glutamic acid hydrochloride and derivative products from a corn gluten hydrolysate which comprises: concentrating the solution to 28°-33° Baumé; cooling it to below 46° F.; adding glutamic acid hydrochloride crystals to the solution; keeping the material in slow agitation during the crystallizing operation and separating the mother liquor from the glutamic acid hydrochloride crystals.

20. Process for the production of glutamic acid hydrochloride and derivative products from a corn gluten hydrolysate which comprises: concentrating the solution to 28°-33° Baumé; cooling it to below 46° F.; adding glutamic acid hydrochloride crystals and hydrochloric acid to the solution; keeping the material in slow agitation during the crystallizing operation and separating the mother liquor from the glutamic acid hydrochloride crystals.

21. Process for the production of glutamic acid hydrochloride and derivative products which comprises: crystallizing glutamic acid hydrochloride from a corn gluten hydrolysate and removing the mother liquor from the crystals; dissolving the glutamic acid hydrochloride in water; neutralizing the solution and crystallizing glutamic acid; separating the mother liquor and adding hydrochloric acid thereto to precipitate sodium chloride; separating the sodium chloride from the liquor; and reusing the mother liquor in one of the aforesaid crystallizing operations as the process proceeds.

22. Process of crystallizing glutamic acid hydrochloride from a corn gluten hydrolysate which comprises: concentrating and cooling the solution to supersaturation favorable to crystallization of glutamic acid hydrochloride; adding to the solution hydrochloric acid, glutamic acid in part at least in the form of glutamic acid hydrochloride crystals; and keeping the material in slow agitation during crystallization.

23. Process of crystallizing glutamic acid hydrochloride from a corn gluten hydrolysate which comprises: concentrating the solution to 28°–33° Baumé; cooling the solution to below 46° F.; adding to the solution glutamic acid in part at least in the form of glutamic acid hydrochloride crystals, and hydrochloric acid; and keeping the material in slow agitation during crystallization.

J PAUL BISHOP.
FLOYD L. TUCKER.